United States Patent
Okano et al.

(10) Patent No.: US 12,203,602 B2
(45) Date of Patent: Jan. 21, 2025

(54) HYDROGEN SUPPLY SYSTEM

(71) Applicant: JFE STEEL CORPORATION, Tokyo (JP)

(72) Inventors: Hiroshi Okano, Tokyo (JP); Shusaku Takagi, Tokyo (JP); Nobuyuki Ishikawa, Tokyo (JP); Akihide Nagao, Tokyo (JP); Kazuki Matsubara, Tokyo (JP); Toshio Takano, Kanagawa (JP); Kotaro Kadota, Tokyo (JP); Norikazu Yamaguchi, Tokyo (JP); Takuya Hasegawa, Tokyo (JP); Hiroki Kuno, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 147 days.

(21) Appl. No.: 17/776,302

(22) PCT Filed: Nov. 18, 2020

(86) PCT No.: PCT/JP2020/042978
§ 371 (c)(1),
(2) Date: May 12, 2022

(87) PCT Pub. No.: WO2021/100753
PCT Pub. Date: May 27, 2021

(65) Prior Publication Data
US 2022/0397238 A1    Dec. 15, 2022

(30) Foreign Application Priority Data
Nov. 18, 2019  (JP) .................................. 2019-207666

(51) Int. Cl.
*F17C 5/00* (2006.01)
*F17C 1/06* (2006.01)
(Continued)

(52) U.S. Cl.
CPC ................ *F17C 5/007* (2013.01); *F17C 1/06* (2013.01); *F17C 5/06* (2013.01); *F17C 13/02* (2013.01);
(Continued)

(58) Field of Classification Search
CPC .... F17C 5/007; F17C 1/06; F17C 5/06; F17C 13/02; F17C 2205/0376; F17C 2250/032;
(Continued)

(56) References Cited

U.S. PATENT DOCUMENTS 6,901,302 B2 *  5/2005  Kami .................... F17C 11/005
                                                700/95
7,681,753 B2 *  3/2010  Yokota .................. F17C 11/005
                                                220/586
(Continued)

FOREIGN PATENT DOCUMENTS

CN        202484596 U      10/2012
JP        H02-275200 A     11/1990
(Continued)

OTHER PUBLICATIONS

JP2005036918A—English Translation (Year: 2005).*
(Continued)

*Primary Examiner* — Craig M Schneider
*Assistant Examiner* — Christopher M Afful
(74) *Attorney, Agent, or Firm* — Oliff PLC

(57) ABSTRACT

A hydrogen supply system is configured to supply hydrogen to a fuel-cell vehicle by using a receptacle for hydrogen transport, and includes: a filling unit provided at a hydrogen filling facility and configured to fill the receptacle with hydrogen; a management unit configured to calculate a transport timing at which the hydrogen-filled receptacle is transported to a business facility that operates the fuel-cell vehicle; a transport unit configured to transport the hydro-
(Continued)

gen-filled receptacle to the business facility in accordance with the transport timing; and a disposition unit configured to dispose the hydrogen-filled receptacle transported to the business facility at a place to which the fuel-cell vehicle is capable of accessing to have a refill of the hydrogen in the business facility.

7 Claims, 2 Drawing Sheets

(51) Int. Cl.
    *F17C 5/06*     (2006.01)
    *F17C 13/02*     (2006.01)
    *G06Q 10/04*     (2023.01)
    *G06Q 10/08*     (2024.01)
    *H01M 8/04*     (2016.01)

(52) U.S. Cl.
    CPC ....... H01M 8/04 (2013.01); *F17C 2205/0376* (2013.01); *F17C 2250/032* (2013.01); *F17C 2265/065* (2013.01); *F17C 2270/0139* (2013.01); *G06Q 10/04* (2013.01); *G06Q 10/08* (2013.01)

(58) Field of Classification Search
    CPC ...... F17C 2265/065; F17C 2270/0139; H01M 8/04
    USPC ............................................................ 141/4
    See application file for complete search history.

(56) References Cited

U.S. PATENT DOCUMENTS

2004/0163731 A1* 8/2004 Eichelberger ............. F17C 1/00
    141/284
2016/0091140 A1   3/2016  Takagi et al.
2017/0362076 A1* 12/2017  Hall ........................ H04W 4/44
2018/0075567 A1*  3/2018  Mycroft ................ G06Q 50/30

FOREIGN PATENT DOCUMENTS

| | | | |
|---|---|---|---|
| JP | 2000-118532 A | 4/2000 | |
| JP | 2002-089793 A | 3/2002 | |
| JP | 2005036918 A * | 2/2005 | ................ F17C 1/04 |
| JP | 2006-235846 A | 9/2006 | |
| JP | 2016-089891 A | 5/2016 | |
| JP | 2016-170594 A | 9/2016 | |
| JP | 2016-196367 A | 11/2016 | |
| JP | 2017-137926 A | 8/2017 | |
| JP | 2018-162851 A | 10/2018 | |
| JP | 6442785 B2 * | 12/2018 | |
| WO | 2014/174845 A1 | 10/2014 | |
| WO | WO-2017158762 A1 * | 9/2017 | .............. B60L 50/50 |

OTHER PUBLICATIONS

Angstrom Advanced (Commercially available product press sheet found at https://fuelcellsworks.com/news/angstrom-advanced-develops-worlds-first-all-in-one-hydrogen-refueler/). (Year: 2019).*
JP6442785B2 (English Translation) (Year: 2015).*
WO-2017158762-A1—English Translation (Year: 2017).*
May 17, 2022 Office Action issued in Japanese Patent Application No. 2020-191370.
Apr. 11, 2023 Office Action issued in Chinese Patent Application No. 202080078259.1.
1 Dec. 9, 2022 Extended Search Report issued in European Patent Application No. 20890317.9.
Jan. 19, 2021 International Search Report issued in International Patent Application No. PCT/JP2020/042978.
Apr. 23, 2024 Office Action issued in Korean Patent Application No. 10-2022-7020101.

* cited by examiner

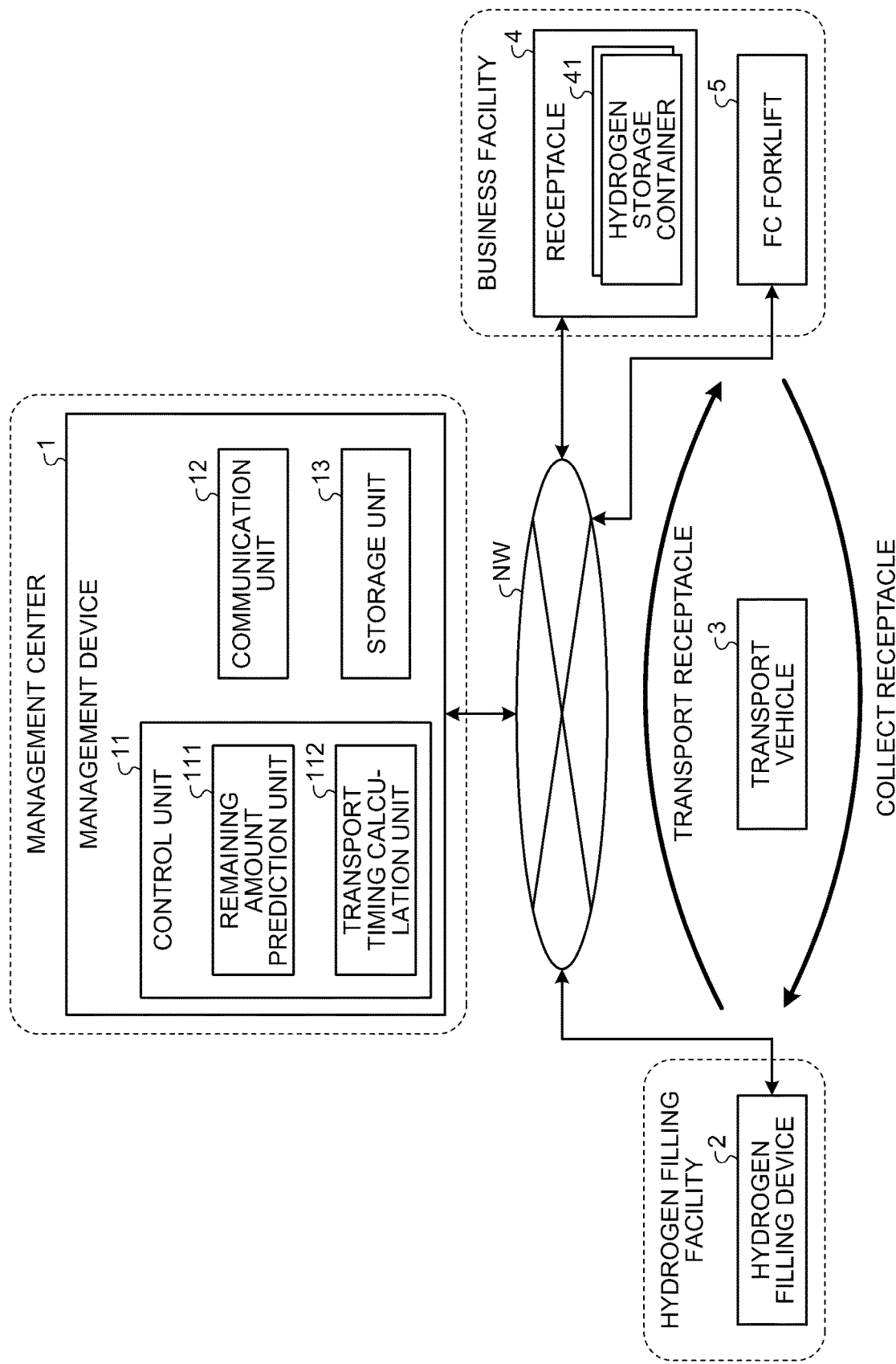

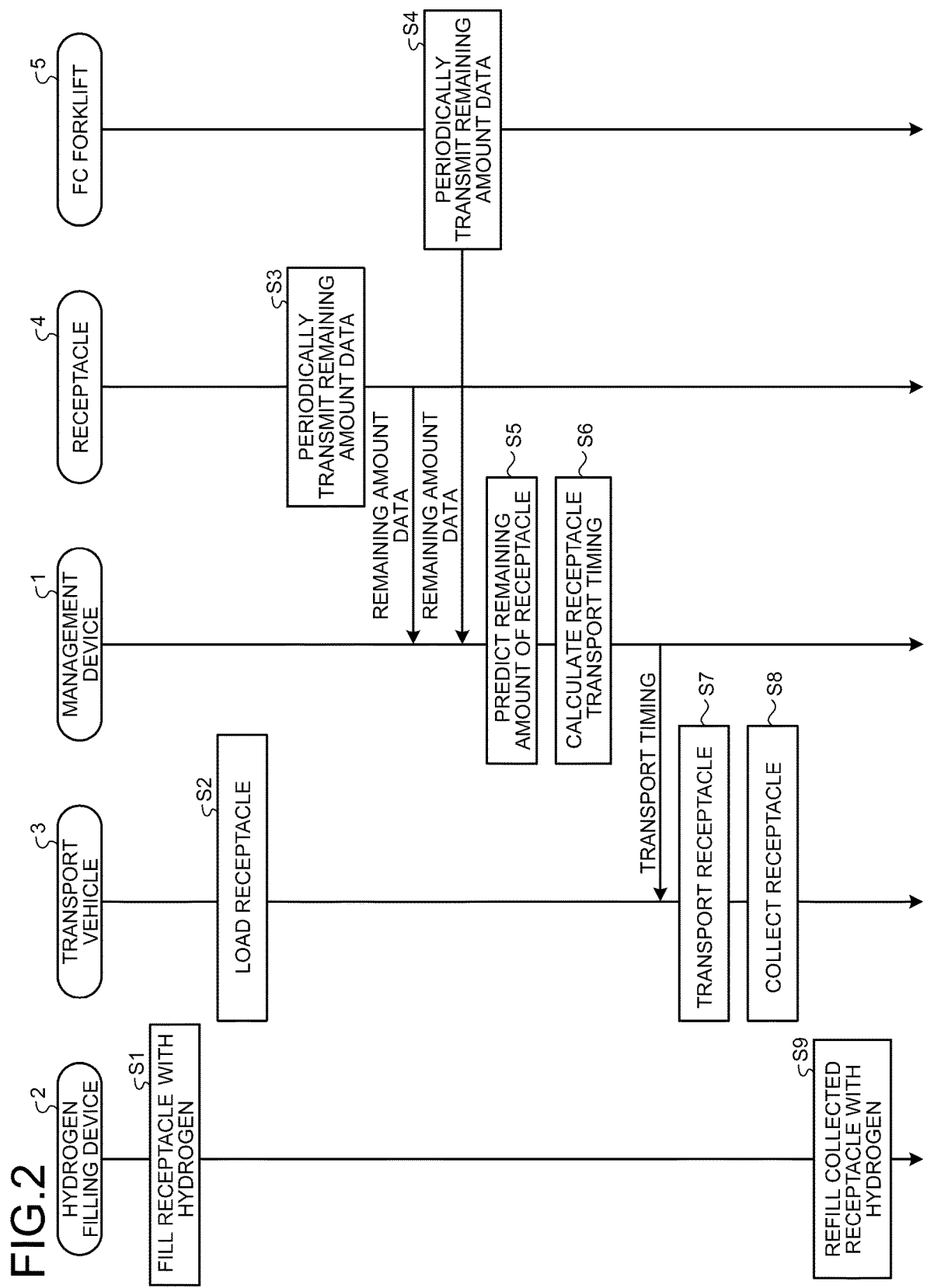

HYDROGEN SUPPLY SYSTEM

FIELD

The present invention relates to a hydrogen supply system.

BACKGROUND

At a business facility such as a distribution warehouse or a factory, expectations are running high for a fuel-cell forklift (hereinafter referred to as an "FC forklift") because of advantages such as $CO_2$ reduction as well as filling time reduction and unnecessity of backup batteries.

A typical fuel-cell vehicle travels to a hydrogen station provided at a particular place to have a refill of hydrogen (hydrogen gas) as fuel (refer to Patent Literature 1, for example). However, some commercial vehicles such as the FC forklifts operated at the business facility or the like cannot travel on a public road and thus have difficulty in traveling to a hydrogen station to have a refill of hydrogen. Furthermore, since spread of FC forklifts is at an initial stage in Japan, it is difficult in reality to hold a hydrogen station in, for example, a business facility.

Thus, recently, a mobile supply system using a dedicated filling vehicle (hereinafter referred to as a "mobile hydrogen station") has become available as a system of hydrogen supply to the FC forklifts. The mobile hydrogen station used in this system is constituted by, for example, a dedicated large-sized truck provided with a cargo bed on which a hydrogen storage container and a hydrogen filling device are installed.

The mobile hydrogen station fills a hydrogen storage zone with hydrogen at a hydrogen filling facility provided at a particular place, and then moves to the business facility having made a request and fills, with hydrogen, an FC forklift having a decreased hydrogen storage amount. Note that, since the hydrogen storage container provided at the mobile hydrogen station is fixed to the cargo bed, it is impossible to remove and transport the hydrogen storage container itself.

CITATION LIST

Patent Literature

Patent Literature 1: Japanese Patent No. 6442785

SUMMARY

Technical Problem

The mobile supply system using a conventional mobile hydrogen station has problems as described below. For example, when the hydrogen storage amount of the FC forklift in the business facility has decreased, the mobile hydrogen station transports hydrogen upon a request from the business operator side. Thus, when arrival of the mobile hydrogen station is delayed because of an unexpected reason such as traffic congestion, hydrogen in the FC forklift runs out first, which interferes operation in some cases.

Furthermore, a typical mobile hydrogen station carries hydrogen in an amount enough for supply to three or four FC forklifts and visits and transports hydrogen to a plurality of business facilities in one service. Thus, there is the problem that hydrogen runs out before a business facility far from the hydrogen filling facility is reached and hydrogen cannot be supplied to a business facility at a remote place.

In addition, considerable cost is needed to operate a single mobile hydrogen station, and thus, for example, it is difficult in reality to shuttle a plurality of mobile hydrogen stations between the hydrogen filling facility and a plurality of business facilities. Thus, with the mobile supply system using the conventional mobile hydrogen station, it is difficult for the mobile hydrogen station to arrive at a timing desired by each business facility, and there is the problem that the FC forklift cannot be refilled when needed, which results in low usability.

The present invention is made in view of the above description and an object is to provide a hydrogen supply system capable of supplying hydrogen to a fuel-cell vehicle at a desired timing.

Solution to Problem

To solve the above-described problem and achieve the object, a hydrogen supply system according to the present invention is configured to supply hydrogen to a fuel-cell vehicle by using a receptacle for hydrogen transport, and includes: a filling unit provided at a hydrogen filling facility and configured to fill the receptacle with hydrogen; a management unit configured to calculate a transport timing at which the hydrogen-filled receptacle is transported to a business facility that operates the fuel-cell vehicle; a transport unit configured to transport the hydrogen-filled receptacle to the business facility in accordance with the transport timing; and a disposition unit configured to dispose the hydrogen-filled receptacle transported to the business facility at a place to which the fuel-cell vehicle is capable of accessing to have a refill of the hydrogen in the business facility.

In the above-described hydrogen supply system according to the present invention, the receptacle includes a dispenser unit configured to supply the hydrogen to the fuel-cell vehicle.

In the above-described hydrogen supply system according to the present invention, the transport unit is configured to collect the receptacle disposed in the business facility and having a decreased hydrogen storage amount, and transport the receptacle to the hydrogen filling facility, and the filling unit is configured to fill the receptacle transported to the hydrogen filling facility with the hydrogen.

In the above-described hydrogen supply system according to the present invention, when collecting the receptacle having a decreased hydrogen storage amount, the transport unit is configured to transport another hydrogen-filled receptacle to the business facility.

The above-described hydrogen supply system according to the present invention further includes a remaining amount data acquisition unit configured to acquire hydrogen remaining amount data on a receptacle disposed at the business facility, wherein the management unit is configured to predict, based on the remaining amount data, a remaining amount of the hydrogen in future in the receptacle disposed at the business facility, and calculate the transport timing based on the predicted remaining amount of the hydrogen.

In the above-described hydrogen supply system according to the present invention, the remaining amount data acquisition unit is configured to further acquire hydrogen remaining amount data on the fuel-cell vehicle operated at the business facility, and the management unit is configured to predict the remaining amount of the hydrogen that is able to be used at the business facility in future based on the remaining amount data on the receptacle and the remaining amount data on the fuel-cell vehicle, and calculate the transport timing based on the predicted remaining amount of the hydrogen.

In the above-described hydrogen supply system according to the present invention, the receptacle includes a plurality of hydrogen storage containers, and each of the hydrogen storage containers is a composite structure container made of a steel liner and a carbon-fiber-reinforced plastic.

In the above-described hydrogen supply system according to the present invention, the carbon-fiber-reinforced plastic used for each of the hydrogen storage containers has a longitudinal elastic modulus equal to or larger than 230 GPa.

In the above-described hydrogen supply system according to the present invention, each of the hydrogen storage containers has a maximum hydrogen storage pressure of 40 MPa or higher.

Advantageous Effects of Invention

According to the present invention, it is possible to supply hydrogen to a fuel-cell vehicle at a desired timing by transporting a portable receptacle to the business facility and keeping and using the receptacle at the business facility. Specifically, according to the present invention, the timing of filling a fuel-cell vehicle with hydrogen can be determined by a user, which improves convenience at hydrogen supply.

BRIEF DESCRIPTION OF DRAWINGS

FIG. 1 is a block diagram illustrating a schematic configuration of a hydrogen supply system according to an embodiment of the present invention.

FIG. 2 is a flowchart illustrating a process of a hydrogen supply method by the hydrogen supply system according to the embodiment of the present invention.

DESCRIPTION OF EMBODIMENTS

The following describes a hydrogen supply system according to an embodiment of the present invention with reference to the accompanying drawings. Note that, constituent components in the embodiment described below include those easily replaceable by the skilled person in the art or those identical in effect.

(Hydrogen Supply System)

The following first describes the hydrogen supply system according to the present embodiment with reference to FIG. 1. The hydrogen supply system is a system for supplying hydrogen to an FC forklift 5 as a fuel-cell vehicle by using a receptacle 4 for hydrogen transport. The hydrogen supply system includes a management device 1, a hydrogen filling device 2, a transport vehicle 3, the receptacle 4, and the FC forklift 5 operated at a business facility.

Note that, the above-described "business facility" is, for example, a distribution warehouse or a factory. Furthermore, there may be a plurality of business facilities. Moreover, there may be a plurality of FC forklifts 5 operated at each business facility.

The management device 1, the hydrogen filling device 2, each receptacle 4, and each FC forklift 5 can perform mutual communication through a network NW. The network NW is constituted by, for example, the Internet network, a cellular-phone network, and the like.

(Management Device)

The following describes the management device (management unit) 1. The management device 1 is provided at a management center. The management device 1 includes a control unit 11, a communication unit 12, and a storage unit 13. Specifically, the control unit 11 includes a processor constituted by a central processing unit (CPU), a digital signal processor (DSP), or a field-programmable gate array (FPGA), and a memory (main storage unit) constituted by a random access memory (RAM) or a read only memory (ROM) (neither illustrated).

The control unit 11 loads a computer program stored in the storage unit 13 onto a work area of the main storage unit, executes the computer program, and controls each component or the like through the execution of the computer program, thereby achieving a function matching a predetermined purpose. The control unit 11 functions as a remaining amount prediction unit 111 and a transport timing calculation unit 112 through the execution of the computer program. Note that, details of the remaining amount prediction unit 111 and the transport timing calculation unit 112 will be described later.

The communication unit 12 is constituted by, for example, a local area network (LAN) interface board, a wireless communication circuit for wireless communication, and the like. The communication unit 12 is connected to the network NW such as the Internet as a public communication network. In addition, the communication unit 12 performs communication with the hydrogen filling device 2, each receptacle 4, and each FC forklift 5 by connecting to the network NW.

The storage unit 13 is constituted by a recording medium such as an erasable programmable ROM (EPROM), a hard disk drive (HDD), or a removable media. The removable media is, for example, a universal serial bus (USB) memory or a disk recording medium such as a compact disc (CD), a digital versatile disc (DVD), or a Blu-ray (registered trademark) disc (BD). Furthermore, an operating system (OS), various computer programs, various tables, various databases, and the like can be stored in the storage unit 13. For example, hydrogen remaining amount data periodically transmitted from each receptacle 4 and each FC forklift 5 and data such as a result of calculation by the control unit 11 are stored in the storage unit 13.

(Hydrogen Filling Device)

The following describes the hydrogen filling device (filling unit) 2. The hydrogen filling device 2 is a device for filling, with hydrogen, a receptacle 4 transported by the transport vehicle 3 and is provided at a hydrogen filling facility. The hydrogen filling facility is, for example, a hydrogen generation source configured to generate by-product hydrogen by petroleum refinement and waste plastic generation. The hydrogen filling device 2 includes a non-illustrated compressor, compresses the hydrogen generated at the hydrogen filling facility, and then fills, with the hydrogen, the receptacle 4 collected or transported by the transport vehicle 3.

(Transport Vehicle)

The transport vehicle (transport unit) 3 is a general-purpose vehicle such as a typical truck and transports the receptacle 4 between the hydrogen filling facility and the business facility. The transport vehicle 3 transports a hydrogen-filled receptacle 4 that is filled with hydrogen at the hydrogen filling facility to the business facility. Then, the transport vehicle 3 collects a receptacle 4 disposed in the business facility and having a decreased hydrogen storage amount and transports the collected receptacle 4 to the hydrogen filling facility.

Specifically, when collecting the receptacle 4 having a decreased hydrogen storage amount, the transport vehicle 3 transports another hydrogen-filled receptacle 4 to the business facility. Note that, the "receptacle 4 having a decreased hydrogen storage amount" means, for example, a receptacle 4 having a hydrogen storage pressure decreased to "20 MPa" approximately when the receptacle 4 initially has a hydrogen storage pressure of "45 MPa".

Although a dedicated filling vehicle such as a mobile hydrogen station is used in the conventional mobile supply system, the transport vehicle 3 in the present embodiment may use any vehicle on which a receptacle 4 can be loaded. Furthermore, a plurality of receptacles 4 may be loaded on the transport vehicle 3.

(Receptacle)

Each receptacle 4 is for supplying hydrogen to the FC forklift 5 at the business facility. The receptacle 4 is placed at a predetermined place in the business facility, and when hydrogen filling is needed, the FC forklift 5 travels to the above-described place to be filled with hydrogen. Note that, the hydrogen filling from the receptacle 4 to the FC forklift 5 is directly performed by the driver of the FC forklift 5. Furthermore, the hydrogen filling from the receptacle 4 to the FC forklift 5 is completed in several minutes (for example, three minutes approximately).

The receptacle 4 includes a plurality of hydrogen storage containers 41. Each hydrogen storage container 41 is a composite structure container made of a steel liner (steel pipe) and a carbon-fiber-reinforced plastic. The hydrogen storage container 41 has a structure in which a sheet of the carbon-fiber-reinforced plastic is wound around the steel liner. The carbon-fiber-reinforced plastic used for the hydrogen storage container 41 preferably has a longitudinal elastic modulus equal to or larger than 230 GPa. It is possible to achieve both weight reduction and high rigidity of the hydrogen storage container 41 by using the carbon-fiber-reinforced plastic having the above-described elastic modulus. More preferably, the elastic modulus is equal to or larger than 350 GPa.

Each hydrogen storage container 41 is preferably designed, for example, as described below. Note that, the hydrogen storage pressures of hydrogen storage containers 41 in one receptacle 4 may be all the same (for example, 45 MPa at three receptacles) or may be partially different (for example, 45 MPa at two receptacles and 30 MPa at one receptacle).

(1) Maximum hydrogen storage pressure (maximum storage pressure): 40 MPa or higher
(2) Hydrogen storage amount: preferably less than 300 N·m$^3$
(3) Container capacity: 200 L per container
(4) Container weight: 0.7 t per container
(5) The number of containers: three Although omitted from illustrations in FIG. 1, each receptacle 4 includes a communication unit, a dispenser unit, a sprinkler unit, a protection barrier, and a fork pocket. The communication unit is a unit for periodically transmitting the hydrogen remaining amount data on each hydrogen storage container 41 to the management device 1 through the network NW.

The dispenser unit is a unit for supplying hydrogen to the FC forklift 5 and has at least a function to prevent abrupt temperature increase of the hydrogen storage containers 41 at hydrogen filling. Furthermore, the dispenser unit may include a control valve configured to automatically control a flow rate of hydrogen, and a rapid filling software application configured to perform hydrogen filling while switching a plurality of hydrogen storage containers 41. In addition, the dispenser unit may include an orifice for controlling the flow rate of hydrogen.

Furthermore, the sprinkler unit is a unit for cooling the hydrogen storage containers 41 by sprinkling and provided to prevent exceedance of, for example, a use temperature upper limit set by "High Pressure Gas Safety Act". Furthermore, the protection barrier is a wall provided so that the hydrogen storage containers 41 is not exposed to direct sunlight. Furthermore, the fork pocket is a guide hole into which the FC forklift 5 inserts a click when transporting the receptacle 4 being loaded on the transport vehicle 3.

Each receptacle is preferably designed to have a total weight of, for example, 2.5 t or lower including the above-described plurality of hydrogen storage containers 41, the dispenser unit, the sprinkler unit, and the protection barrier, and the like. With the total weight of 2.5 t or lower, the receptacle 4 can be lifted by the FC forklift 5 and easily loaded onto the general-purpose vehicle.

(FC Forklift)

Each FC forklift 5 is an industrial fuel-cell vehicle operated in the business facility and travels on a non-public road. Although omitted from illustrations in FIG. 1, the FC forklift 5 includes a hydrogen tank (fuel tank) and a communication unit. The communication unit periodically transmits the hydrogen remaining amount data on the hydrogen tank to the management device 1 through the network NW.

The FC forklift 5 functions as a disposition unit configured to dispose the hydrogen-filled receptacle 4 at a predetermined place in the business facility when the transport vehicle 3 has arrived at the business facility. In this case, the FC forklift 5 inserts the click into the fork pocket provided to the receptacle 4 loaded on the transport vehicle 3 and transports the receptacle 4. Note that, the above-described "predetermined place" means a place to which the FC forklift 5 is capable of freely accessing to have a refill of hydrogen in the business facility and around which an explosion-proof electric facility is disposed.

(Hydrogen Supply Method)

The following describes a method of hydrogen supply by the hydrogen supply system with reference to FIG. 2. First, the hydrogen filling device 2 fills the receptacle 4 with hydrogen (step S1). Subsequently, the hydrogen-filled receptacle 4 is loaded onto a cargo bed of the transport vehicle 3 by using a non-illustrated loading unit (for example, a forklift) (step S2).

Subsequently, residual pressures of the receptacle 4 and the FC forklift 5 are measured by using a pressure meter and a thermometer, and the hydrogen remaining amount data is acquired from temperatures and pressures thus obtained. Thereafter, the hydrogen remaining amount data is periodically transmitted to the management device 1 (steps S3 and S4). Subsequently, the remaining amount prediction unit 111 of the management device 1 measures the residual pressures of the receptacle 4 and the FC forklift 5 by using the pressure meter and thermometer provided to each of the receptacle 4 and the FC forklift 5, and acquires the hydrogen remaining amount data from temperatures and pressures thus obtained. Then, the remaining amount prediction unit 111 predicts the remaining amount of hydrogen that can be used at the business facility in future based on these remaining amount data (step S5).

Note that, the above-described temperatures do not necessarily need to be obtained by directly measuring the temperatures of the containers, and for example, an environmental temperature such as outside temperature of an environment in which the containers are used may be used.

Furthermore, at step S5, the remaining amount of hydrogen that can be used the business facility in future can be predicted by using, for example, Expression (1) below.

$$R(T) = \sum_{i=0}^{n} \alpha_i(t)C_i - \sum_{i=0}^{m} \{FC_i\{1 - \beta_i(t)\} + X_i\} \quad (1)$$

Symbols in Expression (1) above denote as follows.

R (T): Remaining amount of hydrogen that can be used at the business facility T hours after $\alpha_i(t)$: correction ratio of the hydrogen remaining amount of the i-th receptacle 4, which is periodically received by the remaining amount prediction unit 111

$C_i$: hydrogen stored amount of the i-th receptacle 4

$FC_i$: hydrogen stored amount of the i-th FC forklift 5

$\beta_i(t)$: correction ratio of the hydrogen remaining amount of the i-th FC forklift 5, which is periodically received by the remaining amount prediction unit 111

$X_i$: consumed hydrogen amount of the i-th FC forklift 5 per unit time

The following describes exemplary calculation (exemplary prediction) of a hydrogen remaining amount in future by using Expression (1) above. In this example, at a business facility owns and operates one receptacle 4 and two FC forklifts 5, and a remaining amount of hydrogen that can be used at the business facility in future one hour after is predicted for a case in which values received by the remaining amount prediction unit 111 at time t are as follows.

$\alpha_i(t)$: correction ratio of the hydrogen remaining amount of the first receptacle 4, which is received by the remaining amount prediction unit 111 at time t=0.8

$C_i$: hydrogen stored amount of the first receptacle 4=10 kg $FC_1$: hydrogen stored amount of the first FC forklift 5=1 kg $FC_2$: hydrogen stored amount of the second FC forklift 5=1 kg $\beta_1(t)$: correction ratio of the hydrogen remaining amount of the first FC forklift 5, which is received by the remaining amount prediction unit 111 at time t=0.2

$\beta_2(t)$: correction ratio of the hydrogen remaining amount of the second FC forklift 5, which is received by the remaining amount prediction unit 111 at time t=0.5

$X_1$: consumed hydrogen amount of the first FC forklift 5 per one hour=0.2 kg/h $X_2$: consumed hydrogen amount of the second FC forklift 5 per one hour=0.4 kg/h In this case, the remaining amount prediction unit 111 calculates the remaining amount of hydrogen that can be used at the business facility in future one hour after by using Expression (1) above as described below.

R(1)=0.8×10 kg−{1 kg(1−0.2)+0.2 kg}−1 kg{1 kg(1−0.5)+0.4 kg}=8 kg−1 kg−0.9 kg=6.1 kg

In Expression (1) above, $X_i$ is preferably calculated from an operation record at each business facility or the like by computational science using IoT or the like. Furthermore, the remaining amount prediction unit 111 may predict the number of FC forklifts 5 that can be filled with hydrogen remaining in a receptacle 4. Hereinafter, description of step S6 or later in FIG. 2 will be continued.

Subsequently, the transport timing calculation unit 112 of the management device 1 calculates, based on the hydrogen remaining amount of the receptacle 4 in future, which is predicted by the remaining amount prediction unit 111, a transport timing at which a hydrogen-filled receptacle 4 is transported to the business facility (step S6). The transport timing calculation unit 112 calculates, as the transport timing, for example, a time point earlier than a time point at which the hydrogen remaining amount of the receptacle 4 disposed at the business facility runs out.

Note that, when calculating the transport timing, the transport timing calculation unit 112 may calculate the transport timing, with consideration on, for example, the degree of congestion of vehicles on a travel route of the transport vehicle 3 to the business facility, or the like. Alternatively, the transport timing calculated by the transport timing calculation unit 112 may be a time at which the transport vehicle 3 departs the hydrogen filling facility or may be a time at which the transport vehicle 3 arrives at the business facility.

Subsequently, the transport vehicle 3 transports a hydrogen-filled receptacle 4 to the business facility in accordance with the transport timing calculated by the transport timing calculation unit 112 (step S7). Specifically, when the above-described transport timing is the time of departure from the hydrogen filling facility, the transport vehicle 3 departs the hydrogen filling facility at the time, or when the above-described transport timing is the time of arrival at the business facility, the transport vehicle 3 arrives at the business facility in the time.

Furthermore, when having transported the hydrogen-filled receptacle 4 to the business facility, the transport vehicle 3 also collects a receptacle 4 having a decreased hydrogen storage amount (step S8). Then, the hydrogen filling device 2 refills, with hydrogen, the receptacle 4 having a decreased hydrogen storage amount and transported by the transport vehicle 3 (step S9). Thereafter, steps S2 to S9 are repeated.

With the hydrogen supply system according to the present embodiment as described above, it is possible to supply hydrogen to the FC forklift 5 at a desired timing by transporting a portable receptacle 4 to the business facility and keeping and using the receptacle at the business facility. In other words, with the hydrogen supply system according to the present embodiment, the timing of filling the FC forklift 5 with hydrogen can be determined by the user, which improves convenience at hydrogen supply.

Furthermore, with the hydrogen supply system according to the present embodiment, it is possible to transport the receptacle 4 to the business facility at an optimum timing, thereby preventing a situation in which hydrogen in the FC forklift 5 runs out before the receptacle 4 is transported.

The hydrogen supply system according to the present invention has been described in detail by means of the form of the invention and examples, but the scope of the present invention is not limited to these descriptions, and should be interpreted broadly based on the claims. In addition, it goes without saying that various changes and modifications based on these descriptions are also included in the scope of the present invention.

For example, the example in which the hydrogen supply system is applied to the FC forklift 5 as the industrial fuel-cell vehicle is described in the above-described embodiment, but the hydrogen supply system may be applied to a household fuel-cell vehicle. Furthermore, the hydrogen supply system is applicable not only to the fuel-cell vehicle but also to a mobile object such as a ship or a drone on which a fuel cell system is implemented.

Furthermore, in the above-described embodiment, the remaining amount prediction unit 111 of the management device 1 acquires the hydrogen remaining amount data on the receptacle 4 and the FC forklift 5 and predicts, based on these remaining amount data, the remaining amount of hydrogen that can be used at the business facility in future (refer to step S5 in FIG. 2), but the remaining amount prediction unit 111 may acquire only the hydrogen remaining amount data on the receptacle 4. In this case, the remaining amount prediction unit 111 acquires the hydrogen remaining amount data on the receptacle 4 and predicts the hydrogen remaining amount of the receptacle 4 disposed at the business facility in future based on the remaining amount data. Note that, as in the above-described embodiment, by acquiring the hydrogen remaining amount data from both the receptacle 4 and the FC forklift 5, the accuracy of prediction of the hydrogen remaining amount is improved as compared to a case of acquiring the hydrogen remaining amount data only from the receptacle 4.

REFERENCE SIGNS LIST 1 management device
11 control unit
111 remaining amount prediction unit
112 transport timing calculation unit
12 communication unit
13 storage unit
2 hydrogen filling device
3 transport vehicle
4 receptacle
41 hydrogen storage container
5 FC forklift
NW network

The invention claimed is:

1. A hydrogen supply system configured to supply hydrogen to a fuel-cell vehicle by using a receptacle for hydrogen transport, the hydrogen supply system comprising:
a filling dispenser provided at a hydrogen filling facility and configured to fill the receptacle with hydrogen;
a processor configured to calculate a transport timing at which the hydrogen-filled receptacle is transported to a business facility that operates the fuel-cell vehicle;
a transport vehicle configured to transport the hydrogen-filled receptacle to the business facility in accordance with the transport timing; and
a disposition vehicle configured to dispose the hydrogen-filled receptacle transported to the business facility at a place to which the fuel-cell vehicle is capable of accessing to have a refill of the hydrogen in the business facility,
wherein the processor is further configured to:
acquire hydrogen remaining amount data on the receptacle disposed at the business facility,
acquire hydrogen remaining amount data on the fuel-cell vehicle operated at the business facility,
predict a remaining amount of the hydrogen that is able to be used at the business facility in the future based on the hydrogen remaining amount data on the receptacle, the hydrogen remaining amount data on the fuel-cell vehicle, a correction ratio of a hydrogen remaining amount of the receptacle, a correction ratio of a hydrogen remaining amount of the fuel-cell vehicle and a consumed hydrogen amount of the fuel-cell vehicle per unit time, and
calculate the transport timing based on the predicted remaining amount of the hydrogen.

2. The hydrogen supply system according to claim 1, wherein the receptacle includes a dispenser configured to supply the hydrogen to the fuel-cell vehicle.

3. The hydrogen supply system according to claim 1, wherein
the transport vehicle is configured to
collect the receptacle disposed in the business facility and having a decreased hydrogen storage amount, and
transport the receptacle to the hydrogen filling facility, and
the filling dispenser is configured to fill the receptacle transported to the hydrogen filling facility with the hydrogen.

4. The hydrogen supply system according to claim 3, wherein, when collecting the receptacle having a decreased hydrogen storage amount, the transport vehicle is configured to transport another hydrogen-filled receptacle to the business facility.

5. The hydrogen supply system according to claim 1, wherein
the receptacle includes a plurality of hydrogen storage containers, and
each of the hydrogen storage containers is a composite structure container made of a steel liner and a carbon-fiber-reinforced plastic.

6. The hydrogen supply system according to claim 5, wherein the carbon-fiber-reinforced plastic used for each of the hydrogen storage containers has a longitudinal elastic modulus equal to or larger than 230 GPa.

7. The hydrogen supply system according to claim 5, wherein each of the hydrogen storage containers has a maximum hydrogen storage pressure of 40 MPa or higher.

* * * * *